3,081,181
AMYLOSE SPONGES AND GAUZE
Morton W. Rutenberg, North Plainfield, and Wadym Jarowenko, Plainfield, N.J., assignors to National Starch and Chemical Corporation, New York, N.Y., a corporation of Delaware
No Drawing. Filed July 13, 1960, Ser. No. 42,520
11 Claims. (Cl. 106—122)

This invention relates to a method for producing sponges and gauze, and to the products thus prepared.

It is our particular object to prepare such sponges and gauze from amylose. Another object is to make such sponges and gauze, which are relatively strong and have high water absorbability, and which furthermore are absorbable by the human body. Additional objects include the use of these materials in surgical procedures, and in other applications such as in non-woven fabrics, absorbent pads and blotting papers. Other uses will become apparent from a consideration of the properties of the sponges and gauze of this invention.

The present application is a continuation-in-part of our application, Serial No. 797,820 filed February 26, 1959, now abandoned.

There has long been a need for a practical and economically feasible method of making sponges and gauze from a readily available an drelatively low cost substance which is non-toxic and absorbable by the human body. There is a wide field of use for such articles in surgical procedures, where absorbable sponges and gauze are specifically indicated, or where it is necessary to guard against damage resulting from the accidental enclosure within the human body, of non-absorbable materials.

One of the substances which has been suggested for the preparation of absorbable sponges and gauze is starch. Because it is non-toxic and readily absorbable by the human body, many attempts have been made to use it as the raw material for the preparation of sponges. Thus, for example, it has been proposed to gelatinize starch in water by heating, followed by freezing of the starch dispersion, and then thawing the frozen mass, to result in a spongy structure. However, this freeze-thaw procedure has not been found to be entirely satisfactory, partly because of the difficulty in controlling the operation on a commercial scale, and because of economic consideration.

We have now discovered that highly satisfactory sponges and gauze may be prepared from amylose, by a relatively simple process.

It is known that starch consists of two fractions, the molecular arrangement of one being linear, and the other being branched. The linear fraction is known as amylose, and the branched fraction as amylopectin. Methods for fractionating starch into these two components are well known, and amylose is therefore available as a separate and distinct material. Starches from the conventional sources (e.g. corn, tapioca, potato, etc.) contain no more than about 30% amylose, and usually less. However, some starches have been genetically developed which contain 50% or more of amylose, and these "starches" begin to assume the properties of amylose, rather than of starch. When we use the term "amylose" in the specification and claims, we refer to the amylose resulting from the fractionation of the amylose and amylopectin components of starch, or to whole starch which is composed of at least 50% amylose, or to mixtures of whole starch with at least 50%, by weight of amylose.

Amylose, like starch, is non-toxic and absorbable by the human body. On the other hand, because it is structurally different from starch, being devoid of the branched amylopectin molecules, it has some properties which are radically different from those of starch. Thus, ordinary starch may be dispersed in water ("gelatinized") by mere heating at temperatures from about 90° to about 100° C., at atmospheric pressures. On the other hand, isolated amylose cannot be dispersed in this manner, and in order to disperse it in water, in the absence of special added chemicals, it is necessary to use much higher temperatures and super-atmospheric pressures.

Another, and perhaps more important characteristic of amylose, for the purposes of our invention, is its tendency to retrograde. Because of the linear arrangement of its molecules, a dispersion of amylose quickly retrogrades to its insoluble form. In a dispersion this shows itself as a gelling and thickening of the mass, upon cooling.

We have now discovered that excellent sponges and gauze, characterized by high wet strength, water absorbability and absorbability by the human body, may be made by making an aqueous dispersion of amylose, converting it to a foam, and then permitting the foam to set to the insoluble state. This setting is believed to be due to retrogradation of the amylose.

As indicated by the above discussion of the dispersion of amylose in water by heating at high temperatures and under super-atmospheric pressure, as in an autoclave, the sponge or gauze can be made by dispersing the amylose in that manner, causing it to foam by any known means (as by beating, bubbling an inert gas such as nitrogen through it, or adding foam-producing chemicals), and then casting the resultant foam into the desired shape (thin layers for gauze, thicker blocks for sponge) and permitting the mass to cool to room temperature, whereby the amylose retrogrades and a strong, spongy mass is produced.

The foaming of an amylose dispersion, and permitting it to retrograde to a spongy mass, represents the broad concept of our invention. However, in preparing the products of our invention there are at least three methods which may be employed:

(I) *Alkaline dispersion.*—One of these techniques utilizes that property of amylose which allows it to be dispersed in water, without the need for very high temperatures or super-atmospheric pressures, by using a solution of an alkaline base as the dispersing medium. Thus, amylose readily disperses in water containing from about 15% to 50% of an alkaline material, based on the weight of the amylose. By "alkaline material" we refer to any strongly basic substance, such as the alkali metal hydroxides and the quaternary ammonium bases.

Thus our sponges or gauze may be produced by making an alkaline aqueous dispersion of amylose, foaming the dispersion in the presence of a foam stabilizer by beating, sometimes with additional inflation with gases, followed by gelling the foam. The following is a more detailed description of this method:

First we disperse amylose in water containing from 15% to 50% by weight of an alkaline material (based on the weight of the amylose). Enough amylose is used to provide a dispersion having an amylose concentration of from about 6% to 20%, and preferably 10%. We then add from about 2% to about 10% (based on the weight of the amylose) of a foam stabilizer, and beat the mixture to produce a foam. If desired, the foam stabilizer may be added to the water before dispersing the amylose therein.

As the foam stabilizer, we may use any alkali-resistant non-ionic, anionic or cationic surfactant. We prefer the alkali-resistant block polymers formed by the sequential addition of propylene and ethylene oxides to propylene glycol, as represented by the following structural formula:

$$HO(C_2H_4O)_a\text{---}(C_3H_6O)_b\text{---}(C_2H_4O)_cH$$

where $a=67\text{--}82$, $b=27\text{--}32$, and $c=67\text{--}82$. These non-ionic surfactants are commercially available from the Wyandotte Chemicals Corporation under the trade name "Pluronic," and in this class we particularly prefer "Pluronic F68," this being a block polymer of the above formula, and having a molecular weight of approximately 8,800.

Among other alkali-resistant foam stabilizers there may be mentioned the block polymer formed by the sequential addition of propylene and ethylene oxides to ethylenediamine, as sold by the Wyandotte Chemicals Corporation under the trade name "Tetronic 908"; also the non-ionic surfactant nonyl phenoxy polyoxyethylene glycol, as sold by the Antara Chemicals division of the General Aniline & Film Corp. under the trade name "Igepal CO–880." Still others include the anionic surfactants such as the common alkali metal soaps (for example, Proctor & Gamble's "Ivory Soap"), and synthetic ionics such as sodium dodecyl benzene sulfonate. The amine salts and quarternary bases are suitable cationic surfactants.

Having the foamed alkaline amylose dispersion, containing the foam stabilizer, the next step is to inflate and gel the foam. The purpose of the inflating agent is to increase the physical volume of the foam, and the gelling agent serves to cause the amylose foam to set to a stable structure, essentially by removing the alkali and thus returning the amylose to its insoluble form. While inflation of the foam is ordinarily desirable, there may be cases where a denser sponge is wanted, and where the foam caused by the original beating of the amylose dispersion is sufficient, without further inflation.

There are a number of methods for inflating and gelling foam, sometimes by the use of a single reagent which performs both functions, and sometimes by the use of a combination of reagents. Some of these suggested methods are as follows:

(1) We may add an ammonium salt to the foam. This is done by adding an aqueous solution of an organic or inorganic ammonium salt, preferably ammonium sulfate. Such salts in effect combine the functions of inflating and gelling agents. When added to the foam, the ammonium salt begins to neutralize the dispersion as it reacts with the available alkali. Simultaneously, as the foam starts to set, the free ammonia caused by the reaction is expelled, and acts as an inflation agent which maintains the foam structure until the amylose has set sufficiently. Enough of this salt is used to react with at least part of the alkali. Ordinarily between about 20% and 33% of the salt, based on the weight of the amylose, is required; it having been found that as the concentration of amylose in the original alkaline dispersion is lowered it is desirable to neutralize a larger proportion of the available alkali, in order to achieve a stable foam and sponge. Other ammonium salts may, of course, be used, such for example as ammonium oxalate, ammonium gluconate, dibasic ammonium citrate, ammonium chloride and dibasic ammonium phosphate.

(2) Another procedure which may be employed is to inflate the foam by bubbling an inert gas, such as nitrogen, through it. This involves the addition of a separate gelling agent, and for this we may use any acid in a quantity sufficient to neutralize at least a substantial part of the available alkali and cause the foam to retrograde to a stable structure.

(3) Still another alternative is to use an ammonium salt, together with an inert gas such as nitrogen. Whether or not it is necessary also to use an acid depends on whether enough of the ammonium salt is employed to neutralize a substantial part of the available alkali.

(4) We can add an acid, and a solution of an alkali metal carbonate or bicarbonate. The acid acts to neutralize the amylose foam, and also reacts with the carbonate or bicarbonate to release carbon dioxide, which then acts as the inflating agent. It is seen, of course, that here too the amount of carbonate or bicarbonate used will vary with the amount of alkali to be reacted. Any acid may be employed; we ordinarily prefer acetic or citric acid, but there is no reason why other acids may not be employed if more readily available or convenient.

The above methods permit of many variations. Thus, in the first-named method, part of the ammonium salt can be replaced with an acid. In the third-named method, one can use merely the gas and ammonium salt, or here too one may replace part of the ammonium salt with an acid. However, in very case it is seen that one is neutralizing the alkali of the original amylose dispersion, and thus causing the amylose foam to set and become "gelled" and strengthened, and one is also causing a gas to inflate the foam (regardless of whether this gas is an added, extraneous material, or is formed "in situ").

The stabilized amylose foam, with the inflating and gelling agent, is then placed in a mold-like form, if a sponge is to be manufactured, or it is spread in a thin layer on any suitable supporting surface (such as wire gauze or polyethylene film) if a gauze is being made. It is obvious that the size of the mold, or the thickness of the film, can be varied to meet particular specifications for the final products. In any case, the thus cast foam is permitted to age for several hours (preferably from 3 to 24 hours), the exact amount of time necessary depending upon a number of variables, including the amount of gelling agent present and the concentration of amylose in the foam.

In the above method we have furthermore found it advisable to add the gelling agent (i.e. the agent which neutralizes the alkali in the amylose dispersion) in an amount sufficient to neutralize only part, say 50–60% molar basis, of the alkali present. Then, after the foam has been cast and partly aged, to an extent where it can be handled as a self-supporting mass, the sponge or gauze is washed with additional acid in order to neutralize the remainder of the alkaline substance.

After the above-mentioned final neutralization, the sponge or gauze is preferably washed with distilled water in order to remove salts. It is seen, of course, that whether such washing is necessary depends upon the ultimate use to which the material is to be put; for some applications residual salts may be harmless. In order to obtain complete dehydration, the sponge or gauze may then be washed in a volatile, water-miscible organic solvent, such for example as acetone, isopropanol, ethanol or methanol. The material is then dried, by any convenient drying means, either at room temperature, or in a draft or vacuum oven, or with a forced air blower. As a matter of convenience, we have found it advisable to carry out these neutralization, washing and dehydration steps by placing the sponge or gauze on a coarse screen and then allowing the acid, water and alcohol (or equivalent solvent) to run through them in the stated order. After being dried the products ordinarily were capable of absorbing water to the extent of ten to twenty-five times their own dry weight.

Ordinarily, the amylose sponges do not require any plasticization. In the case of the gauze, however, a certain amount of plasticization may sometimes be desirable, to assure optimum flexibility. This can be accomplished by the addition of any suitable plasticizing agent, such for example as glycerol, or other glycols such as diethylene or triethylene glycol. Although these plasticizers can be added to the original foam, we prefer to apply them, in the form of a 10% solution in ethanol or propanol, by spraying the plasticizer solution onto the dehydrated gauze, the total quantity of plasticizer being about 10% or higher, based on the weight of the amylose. Other means of applying the plasticizer will be apparent to the practitioner.

(II) *Formaldehyde stabilization of autoclaved dispersions.*—Another technique which may be used for the preparation of amylose sponges and gauze involves the following steps. The amylose is first dispersed in water by heating it, under pressure, in an autoclave or jet cooker at a temperature above 160° C. The resulting dispersion is stabilized by introducing a solution containing formaldehyde and sodium carbonate. (As an alternative procedure, the formaldehyde may be present during the autoclaving operation provided a buffering agent such as sodium phosphate is also introduced in order to neutralize the acid impurities of the formaldehyde.) A foam stabilizer is also introduced at this time and the stabilized amylose dispersion is then aerated for 5–10 minutes by any suitable means such as by the use of a mechanical agitator. The aerated, stabilized dispersion is thereupon cast to the desired shape and the resulting sponge or gauze is then gelled by being exposed to an ammonia saturated atmosphere. The subsequent procedure as regards washing, dehydration, drying and plasticization of the sponges or gauze is comparable to that herein described for those products prepared by means of the alkaline dispersion method.

In this technique, stabilization, i.e. prevention of premature gelling, of the amylose dispersion is achieved by the reaction of the formaldehyde with the amylose resulting in the formation of hemiacetals which act to inhibit the normal tendency of the amylose to retrograde. The sodium carbonate is necessary in order to raise the pH of the dispersion to a value in the order of from 8–10 thereby counteracting the acidity of any formaldehyde impurities which may be present and it also aids the subsequent foaming of the dispersion. As for the ammonia, it succeeds in gelling or setting the sponge or gauze by reacting with the formaldehyde to form an addition product and thereby reversing the equilibrium favoring the formation of the hemiacetals.

As equivalents for formaldehyde one may employ other low molecular weight aldehydes such as glyoxal. The sodium carbonate may be replaced with comparable alkaline materials such as ammonium or potassium carbonate as well as alkali metal and alkaline earth hydroxides. Other gaseous, formaldehyde binding compounds such as sulfur dioxide and various gaseous aliphatic amines may be utilized in place of ammonia. The foam stabilizers which may be employed correspond to the materials previously described for this purpose in the alkaline dispersion technique, i.e. non-ionic, anionic or cationic surfactants.

With respect to proportions the concentration of amylose in the final dispersion may range from 5–15%, by weight, while the formaldehyde concentration should be in the order of from 20–40% as based on the weight of amylose, this formaldehyde usually being added as the commercially available 37%, by weight, aqueous solution. The use of less than 20% of formaldehyde will fail to stabilize the autoclaved amylose dispersion, while the use of concentrations in excess of 40% are unnecessary and disadvantageous since this would necessitate the use of more ammonia along with extended gelling and washing times. The concentration of foam stabilizer should range from 5–10%, as based on the weight of amylose. The sodium carbonate should be present in an amount sufficient to raise the pH of the dispersion to within the range of from 8 to 10 and for this purpose about 0.05–2.5% of sodium carbonate, as based on the weight of amylose, is adequate.

(III) *Cooling of autoclaved dispersions.*—This method for preparing amylose sponges and gauze is generally similar to the previously described technique involving formaldehyde stabilization of autoclaved amylose dispersions. It involves dispersing the amylose in water by heating it under pressure in an autoclave or jet cooker at a temperature above 160° C. The thus formed dispersion is cooled to about 95° C., a solution of a foam stabilizer is thereupon added and the entire mixture is aerated by beating for 3–7 minutes with a mechanical agitator so as to increase its volume approximately 6–10 times over its original value. During the latter operation care must be taken so as to prevent the temperature of the dispersion from falling to a level at which retrogradation may be initiated prior to the completion of its aeration and subsequent casting into the form desired for the resulting sponges or gauze. In some cases, it may be desirable to accelerate the aeration process by introducing from 0.5–2.5%, as based on the weight of amylose, of ammonium carbonate to the dispersion prior to its beating in a mechanical agitator. After being cast into the desired size and shape, the resulting amylose sponges or gauze are gelled by being allowed to cool for 2–3 hours at room temperature, i.e., 30° C., or by being placed in a refrigerator for about 30 minutes. The subsequent procedure as regards washing, dehydration, drying and plasticization of the sponges or gauze is again comparable to that herein decribed for those products prepared by means of the alkaline dispersion method.

As regards proportions, the initial dispersion may contain from about 10–15% by weight of amylose; however, in the final dispersion to which the foam stabilizer has been added, the amylose concentration should be reduced to within the order of from about 3–15%, by weight, with the optimum concentration being about 6.5%. At amylose concentrations which exceed this suggested maximum limit, it will be found necessary to prepare the sponges at higher temperatures while the use of amylose in concentrations of less than 3% is also to be avoided since the gelling process becomes more difficult. The foam stabilizers which may be employed in this process again correspond to the materials previously described for this purpose in the alkaline dispersion technique, i.e. non-ionic, anionic or cationic surfactants.

The most important variable in this process, however, is the temperature at which it is conducted. Thus, as has already been noted, care must be taken to prevent the temperature of the amylose dispersion from falling to a level at which retrogradation may be initiated prior to its aeration and subsequent casting. This critical temperature will vary according to the amylose concentration of the dispersion. For instance, a dispersion having an amylose concentration of from 6.5–10% may be aerated without danger of retrogradation as long as its temperature is kept above 66° C. However, just before casting this dispersion, its temperature should be brought to the 60–66° C. range and then adequately aerated to form a foam having the desired volume. Immediately after casting, the temperature of this dispersion should be dropped so as to hasten the retrogradation and gelling of the amylose. If, however, aeration is continued below 60° C., retrogradation and gelling of the amylose will proceed but the agitation will cause a breaking up of the foamed gel into retrograded particles, thereby yielding an exceedingly poor sponge. On the other hand, if aeration is stopped at a temperature above 66° C., the foam will break down before gelling sets in unless cooling is extremely rapid.

At amylose concentrations less than 6.5–10%, i.e. 3%, the temperature range for aeration will be lower than the 60–66° C. described above and the temperature for the gelling of the foam will also be lower. In no case, however, will this temperature be less than 10° C. Conversely, at amylose concentrations greater than 10%, i.e. 15% both the aeration and gelling temperatures will be higher.

In spite of the controls which are required in this method of preparing amylose sponges and gauze, it is felt that it nonetheless offers the most feasible commercial technique, yielding sponges and gauze which are free from any appreciable amounts of extraneous materials such as salts and ammonia-formaldehyde addition products.

The following examples will further illustrate the embodiment of our invention. All parts are given by weight, unless otherwise specified.

(I) ALKALINE DISPERSION

Example I

This example illustrates a number of formulations which were used to prepare amylose sponges and gauze by means of the alkaline dispersion technique. In all cases the procedure employed involved preparing an alkaline aqueous dispersion of amylose, forming a foam by beating in the presence of a foam stabilizer, and then simultaneously inflating and gelling the foam by means of a solution of an ammonium salt.

The specific procedure followed here was first to disperse the amylose in a solution of sodium hydroxide in water. The foam stabilizer was then added (e.g. Pluronic, Tetronic, Igepal), and the mixture agitated violently, in a beating action, until a uniformly aerated foam was obtained. With continued agitation, there was then added the ammonium salt (in the form of a 10% solution in distilled water). For making sponges, the foam was placed in 3.5 x 4.5 x 1.75 inch aluminum trays. When gauze was being prepared, the foam was spread upon polyethylene film, in layers of about 0.25 inch thickness. The resulting products were aged for 16 hours at room temperature, and then placed upon screens, where they were first washed with a 5% citric acid solution, and then with distilled water to remove residual salts. They were then dehydrated by washing with isopropanol, and allowed to dry at room temperature. When making gauze, the drying step was preceded by spraying with a 10% alcoholic glycerol solution, to effect plasticization. In the following divisions of this example, illustrating various formulations which were prepared in the above-described manner, the figure for water absorption is based on the weight of the dry sponge or gauze. In other words, a figure of 2030% means that the sponge absorbed 20.3 times its own weight of water.

A (sponge): Parts
- Amylose ............ 200
- Water ............ 800
- NaOH ............ 30
- Pluronic F68 ............ 18
- $(NH_4)_2SO_4$ ............ 24

Percent water absorption=2030.

B (gauze):
- Amylose ............ 100
- Water ............ 900
- NaOH ............ 30
- Pluronic F68 ............ 10
- $(NH_4)_2SO_4$ ............ 33

Percent water absorption=990.

C (sponge):
- Amylose ............ 100
- Water ............ 900
- NaOH ............ 30
- Tetronic 908 ............ 5
- $(NH_4)_2SO_4$ ............ 26

Percent water absorption=640.

D (gauze):
- Amylose ............ 100
- Water ............ 900
- NaOH ............ 30
- Igepal CO-880 ............ 5
- $(NH_4)_2SO_4$ ............ 20

Percent water absorption=520.

E (sponge):
- Amylose ............ 100
- Water ............ 900
- KOH ............ 42
- Pluronic F68 ............ 9
- $(NH_4)_2SO_4$ ............ 22

Percent water absorption=2000.

F (gauze): Parts
- Amylose ............ 100
- Water ............ 900
- NaOH ............ 30
- Pluronic F68 ............ 9
- Ammonium oxalate ............ 15

Percent water absorption=2760.

G (sponge):
- Amylose ............ 100
- Water ............ 900
- NaOH ............ 30
- Pluronic F68 ............ 9
- Ammonium gluconate ............ 29

Percent water absorption=2230.

H (gauze):
- Amylose ............ 100
- Water ............ 900
- NaOH ............ 30
- Pluronic F68 ............ 9
- Ammonium citrate, dibasic ............ 20

Percent water absorption=1880.

I (sponge):
- Amylose ............ 100
- Water ............ 900
- NaOH ............ 30
- Pluronic F68 ............ 9
- Ammonium chloride ............ 30

Percent water absorption=3580.

J (gauze):
- Amylose ............ 100
- Water ............ 900
- NaOH ............ 30
- Pluronic F68 ............ 9
- Dibasic ammonium phosphate ............ 10.5

Percent water absorption=3380.

Example II

In this example we illustrate several variations of the method for making amylose sponge and gauze by the use of an ammonium salt in combination with an acid, as the inflating and gelling agents, respectively. The working procedure was the same as described in Example I, except that the glacial acetic acid was added simultaneously with the ammonium salt solution, to the aerated foam.

A (sponge): Parts
- Amylose ............ 60
- Water ............ 940
- NaOH ............ 24
- Pluronic F68 ............ 1.2
- $NaHCO_3$ ............ 18
- Glacial acetic acid ............ 54

Percent water absorption=1590.

B (gauze):
- Amylose ............ 100
- Water ............ 900
- NaOH ............ 30
- Pluronic F68 ............ 2
- $(NH_4)_2SO_4$ ............ 15
- Glacial acetic acid ............ 15

Percent water absorption=2100.

C (sponge):
- Amylose ............ 100
- Water ............ 900
- NaOH ............ 30
- Ivory soap ............ 2
- $(NH_4)_2CO_3$ ............ 80
- Glacial acetic acid ............ 45

Percent water absorption=510.

Example III

In this example we illustrate the preparation of an amylose sponge by using an inert gas as the inflating agent, and an acid as the gelling agent. The procedure was the same as that described in Example I, except that no ammonium salt was employed, and the nitrogen gas was blown into the foam while the glacial acetic acid was being added.

|  | Parts |
|---|---|
| Amylose | 100 |
| Water | 900 |
| NaOH | 30 |
| Pluronic F68 | 4 |
| Nitrogen gas (as needed for inflation). | |
| Glacial acetic acid | 60 |

Percent water absorption=680.

*Example IV*

This example illustrates the preparation of an amylose sponge by the use of an inert gas in combination with an ammonium salt. The procedure was as described in Example I, except that nitrogen gas was blown in while the ammonium salt solution was being added to the aerated foam.

|  | Parts |
|---|---|
| Amylose | 100 |
| Water | 900 |
| NaOH | 30 |
| Pluronic F68 | 2.8 |
| Nitrogen gas (as needed for inflation). | |
| $(NH_4)_2SO_4$ | 24 |

Percent water absorption=1100.

*Example V*

This example illustrates the preparation of an amylose gauze by the use of an inert gas in combination with an ammonium salt and an acid. The procedure was the same as described in Example I except that nitrogen gas was blown into the aerated foam while the ammonium salt solution was being added, and this was then followed by addition of glacial acetic acid.

|  | Parts |
|---|---|
| Amylose | 100 |
| Water | 900 |
| NaOH | 30 |
| Pluronic F68 | 2 |
| Nitrogen gas (as needed for inflation). | |
| $(NH_4)_2SO_4$ | 8 |
| Glacial actic acid | 44 |

Percent water absorption=950.

*Example VI*

The formulations shown in this example illustrate the preparation of amylose sponges and gauze by the use of an alkali metal carbonate or bicarbonate, in combination with an acid. The procedure was as described in Example I, except that a carbonate or bicarbonate solution was employed instead of the ammonium salt solution, and glacial acetic acid was also added.

A (sponge):

|  | Parts |
|---|---|
| Amylose | 100 |
| Water | 900 |
| Pluronic | 4 |
| NaOH | 30 |
| $Na_2CO_3$ | 12 |
| Glacial acetic acid | 52 |

Percent water absorption=430.

B (gauze):

|  | |
|---|---|
| Amylose | 100 |
| Water | 900 |
| Pluronic F68 | 4 |
| NaOH | 30 |
| $NaHCO_3$ | 12 |
| Glacial acetic acid | 60 |

Percent water absorption=500.

*Example VII*

This example illustrates the making of a sponge from a non-fractionated high-amylose starch. In this case the starch used was one containing 54% amylose.

Thirty parts sodium hydroxide were dissolved in 900 parts water, in which were then dispersed 100 parts of high-amylose corn starch, having a 54% amylose content. Two parts of "Ivory" soap were added, and the mixture beaten until a uniform foam was produced. With continued agitation, we then added 80 parts of ammonium carbonate and 45 parts of glacial acetic acid. Sponges were cast in the manner described in Example I. The percent water absorption of the sponges was found to be approximately 500.

(II) FORMALDEHYDE STABILIZATION OF AUTOCLAVED DISPERSIONS

*Example VIII*

This example illustrates a number of formulations which were used to prepare amylose sponges by means of the technique involving formaldehyde stabilization of autoclaved dispersions. In all cases the procedure employed involved adding the amylose to approximately 50% of the indicated amount of water and forming a dispersion by autoclaving at a temperature of 160° C. for a period of twenty minutes. The amylose dispersion was then combined with an aqueous solution containing a foam stabilizer, formaldehyde (in Formulation "F" glyoxal was substituted for formaldehyde) and sodium carbonate or an equivalent alkaline material in the remainder of the indicated amount of water. The stabilized dispersion was then aerated by beating for from 5–10 minutes in a batter type mixer until its volume had increased about 6–10 times. One-half inch thick sponges were then cast on a polyethylene film and without delay they were then gelled by being placed for from 30–40 minutes into a chamber filled with ammonia saturated air (in Formulations "D" and "G" sulfur dioxide and ethylamine were each, respectively, substituted for ammonia) which was at a temperature of between 30–50° C. After gelling the sponges, they were washed by immersion in water at room temperature so as to remove any excess of ammonia and ammonia-formaldehyde addition products. The washed sponges were then placed on screens so as to permit drainage of excess water. Dehydration was effected by immersing the sponges in isopropanol and again allowing them to drain. The sponges were then dried at room temperature.

A:

|  | Parts |
|---|---|
| Amylose | 55 |
| Water | 945 |
| Formaldehyde (37%) | 13.8 |
| Sodium carbonate | 0.28 |
| Pluronic F68 | 5.5 |
| Ammonia (as needed for gelling). | |

Percent water absorption=5500.

B:

|  | |
|---|---|
| Amylose | 50 |
| Water | 950 |
| Formaldehyde (37%) | 12.5 |
| Sodium carbonate | 1.25 |
| Pluronic F68 | 2.5 |
| Ammonia (as needed for gelling). | |

Percent water absorption=820.

C:

|  | |
|---|---|
| Amylose | 120 |
| Water | 880 |
| Formaldehyde (37%) | 48 |
| Magnesium hydroxide | 0.12 |
| Pluronic F68 | 12 |
| Ammonia (as needed for gelling). | |

Percent water absorption=3100.

D:

| | Parts |
|---|---|
| Amylose | 70 |
| Water | 930 |
| Formaldehyde (37%) | 28 |
| Sodium carbonate | 1.75 |
| Pluronic F68 | 7 |

Sulfur dioxide (as needed for gelling).
Percent water absorption=2800.

E:

| | |
|---|---|
| Amylose | 100 |
| Water | 900 |
| Formaldehyde (37%) | 48 |
| Sodium carbonate | 0.25 |
| Sodium dodecyl benzene sulfonate | 1.0 |

Ammonia (as needed for gelling).
Percent water absorption=2000.

F:

| | |
|---|---|
| Amylose | 100 |
| Water | 1200 |
| Glyoxal | 25 |
| Pluronic F68 | 10 |

Ammonia (as needed for gelling).
Percent water absorption=2100.

G:

| | |
|---|---|
| Amylose | 100 |
| Water | 1200 |
| Formaldehyde (37%) | 25 |
| Pluronic F68 | 10 |

Ethylamine (as needed for gelling).
Percent water absorption=2000.

It should also be noted that each of the above formulations were converted into sponges by a procedure identical to that previously described with the exception that the alcohol dehydration of the sponges was omitted and they were, instead, dried in a forced air oven set at a temperature of 50° C.

(III) COOLING OF AUTOCLAVED DISPERSION

*Example IX*

This sample illustrates a number of formulations which were used to prepare amylose sponges by means of the technique involving the cooling of autoclaved dispersions. In all cases the procedure employed involved adding the amylose to approximately 50% of the indicated amount of water and forming a dispersion by autoclaving at a temperature of 160° C. for a period of twenty minutes. After being cooled to a temperature of about 95° C. the dispersion was then combined with an aqueous solution containing the foam stabilizer in the remainder of the indicated amount of water. In the case of Formulation B, ammonium carbonate was added to the dispersion at this point in order to boost its subsequent aeration. While maintaining its temperature above 60° C., and below 66° C., the dispersion was then aerated for from 3-7 minutes by beating in a batter type of mixer until its volume had increased 7-8 times. Still maintaining its temperature above 60° C., the dispersion was cast into ½" thick sponges upon a polyethylene film. These sponges were then gelled by being allowed to cool for 2-3 hours at room temperature whereupon they were dehydrated by immersion in isopropanol and then drained. The sponges were then allowed to dry at room temperature.

A:

| | Parts |
|---|---|
| Amylose | 65 |
| Water | 935 |
| Pluronic F68 | 6.5 |

Percent water absorption=2000.

B:

| | |
|---|---|
| Amylose | 30 |
| Water | 970 |
| Pluronic F68 | 3.0 |
| Ammonium carbonate | 0.75 |

Percent water absorption=1200.

It should also be noted that each of the above formulations were converted into sponges by a procedure identical to that previously described with the exception that the alcohol dehydration of the sponges was omitted and they were, instead, dried in a forced air oven set at a temperature of 50° C.

Summarizing, our invention is thus seen to provide for the preparation of new and valuable types of sponges and gauze. As for the various procedures described herein, it is to be noted that the general principle which unifies all these techniques is that of controlled gelation of amylose dispersions. Thus, where the amylose is dispersed by alkali, the alkali is neutralized under controlled conditions during or after the production of an aerated foam, thereby reversing the peptizing effect of the alkali and allowing the amylose to retrograde and gel. Similarly, when sufficient formaldehyde is added to a dispersion of amylose prepared by autoclaving, the amylose remains dispersed even at room temperature as a result of the stabilizing action of the formaldehyde; however, if the formaldehyde is effectively removed, as by treatment with ammonia so as to form an addition product, the amylose will retrograde and gel. And finally, we find that an autoclaved amylose dispersion can, upon cooling below approximately 60° C., be retrograded and gelled.

It is understood, of course, that when we speak of the "sponges" of this invention, we refer not to natural sponges (i.e. the skeletal remains of certain marine animals), but rather to materials having a sponge-like structure. This sponge-like structure also includes the herein-described gauze, since the latter differ from conventional shaped sponges only in their relative thickness, but still retain the same sponge-like structure. Variations in materials, proportions and procedures will be apparent to the practitioner, without departing from the scope of this invention, which is limited only by the following claims.

We claim:

1. A method of making a product having the structural form of a sponge which comprises the steps of making a dispersion consisting essentially of from 3% to 20% by weight of amylose in water, foaming said dispersion and permitting the foamed dispersion to set to a spongy mass.

2. A method of making a product having the structural form of a sponge, which comprises the steps of making a dispersion consisting essentially of from 3% to 20% by weight of amylose in water, aerating said dispersion to foam the same, and then permitting the foamed dispersion to set to a spongy mass.

3. A method of making a product having the structural form of a sponge which comprises the steps of making a dispersion consisting essentially of from 3% to 20% by weight of amylose in water and including therewith from 2% to 10%, based on the weight of the amylose, of a foam stabilizer selected from the class consisting of alkali-resistant non-ionic, anionic and cationic surfactants, aerating said stabilized dispersion to foam the same and then permitting the foamed dispersion to retrograde and gell.

4. The method of claim 1 in which the amylose is dispersed in an aqueous solution containing from 15% to 50%, by weight, of an alkali, and in which the alkali in the foamed dispersion is neutralized, thereby permitting the amylose to retrograde and gell.

5. The method of claim 1 in which the amylose dispersion is made by heating the amylose in water in an autoclave at super-atmospheric pressure and at a temperature above 160° C. and stabilizing the same by the addition of a gellation prevention agent consisting of from 20% to 40%, based on the weight of the amylose, of a low molecular weight aldehyde, and in which the foamed dispersion is gelled by effectively removing the aldehyde agent and thereby allowing the amylose to retrograde and gel.

6. The method of claim 1 in which the amylose dispersion is made by heating the amylose in water in an autoclave at super-atmospheric pressure and at a temperature above 160° C., and in which the foamed dispersion is gelled by lowering its temperature to a level allowing the amylose to retrograde and gel.

7. A method for making a product having the structural form of a sponge, which comprises the steps of dispersing from 3% to 20% by weight of amylose in an aqueous alkaline solution containing from 15% to 50%, by weight, of an alkali including in said dispersion from 2% to 10%, based on the weight of the amylose, of a foam stabilizer selected from the class consisting of alkali-resistant non-ionic, anionic and cationic surfactants, aerating the dispersion to form a foam, neutralizing the alkali in the dispersion, and permitting the resulting product to age in order to set it to a sponge-like structure.

8. The method of claim 3 in which the dispersion also includes from 20% to 40%, based on the weight of the amylose, of a low molecular weight aldehyde gellation prevention agent and an alkaline material in an amount to raise the pH of said dispersion to within the range 8 to 10, and in which the gelling of the foamed dispersion is effected by passing the same through an atmosphere saturated with a gaseous, aldehyde binding compound.

9. The method of claim 8 wherein said low molecular weight aldehyde gellation prevention agent is selected from the class consisting of formaldehyde and glyoxal.

10. The method of claim 8 wherein said alkaline material is selected from the class consisting of alkaline earth carbonates, alkali metal carbonates, ammonium carbonate, alkaline earth hydroxides, and alkali metal hydroxides.

11. The method of claim 8 wherein said gaseous, aldehyde binding compound is selected from the group consisting of sulfur dioxide, ammonia, and gaseous aliphatic amines.

References Cited in the file of this patent

UNITED STATES PATENTS

| | | |
|---|---|---|
| 2,597,011 | MacMasters et al. | May 20, 1952 |
| 2,899,362 | Sieger et al. | Aug. 11, 1959 |